United States Patent
Brillout et al.

(10) Patent No.: US 9,710,320 B2
(45) Date of Patent: Jul. 18, 2017

(54) DATA PROCESSING VALIDATION

(71) Applicant: Microsoft Technology Licensing, LLC, Redmond, WA (US)

(72) Inventors: Sebastian Brillout, Paris (FR); Fehmi Ben Haddou, Orleans (FR); Bertrand Freydier, Paris (FR); Aaron Greene, Paris (FR); Yannick Brombach, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 14/666,108

(22) Filed: Mar. 23, 2015

(65) Prior Publication Data

US 2016/0283298 A1 Sep. 29, 2016

(51) Int. Cl.
| | |
|---|---|
| *G06F 7/02* | (2006.01) |
| *H03M 13/00* | (2006.01) |
| *G06F 11/07* | (2006.01) |
| *G06Q 10/00* | (2012.01) |
| *H04L 29/08* | (2006.01) |
| *H04L 12/24* | (2006.01) |

(52) U.S. Cl.
CPC ...... *G06F 11/0787* (2013.01); *G06F 11/0709* (2013.01); *G06F 11/0751* (2013.01); *G06Q 10/00* (2013.01); *H04L 29/08* (2013.01); *H04L 41/00* (2013.01)

(58) Field of Classification Search
CPC .. G06F 11/079; G06F 11/073; G06F 11/0751; G06F 11/0787
See application file for complete search history.

(56) References Cited

U.S. PATENT DOCUMENTS

| | | | |
|---|---|---|---|
| 7,346,652 B2 | 3/2008 | Berrigan et al. |
| 7,366,725 B2 | 4/2008 | Jordan et al. |
| 7,610,294 B2 | 10/2009 | Borgsmidt |
| 7,873,878 B2 | 1/2011 | Belluomini et al. |
| 8,006,126 B2 | 8/2011 | Deenadhayalan et al. |
| 8,069,353 B2 | 11/2011 | Beukema et al. |
| 8,135,958 B2 | 3/2012 | Greco et al. |
| 8,219,887 B2 | 7/2012 | Pruthi |
| 8,504,904 B2 | 8/2013 | Aston |
| 8,805,793 B2 | 8/2014 | Patiejunas et al. |

(Continued)

OTHER PUBLICATIONS

Rusitschka, et al., "Smart Grid Data Cloud: A Model for Utilizing Cloud Computing in the Smart Grid Domain", In Proceedings of First IEEE International Conference on Smart Grid Communications, Oct. 4, 2010, 6 pages.

*Primary Examiner* — Sam Rizk
(74) *Attorney, Agent, or Firm* — Lee & Hayes, PLLC

(57) ABSTRACT

A data processing stage is described which has a communications interface arranged to receive a plurality of input data chunks. Each input data chunk has a pointer to a validation record, where the validation records are stored at a memory accessible to the data processing stage. A processor of the data processing stage is configured to create an output validation record at the memory, and to link the output validation record to the validation records of the input chunks. The processor is configured to compute an output chunk from the input chunks in a manner which ignores data of the input chunks identified as invalid through inspection of the output validation record.

20 Claims, 8 Drawing Sheets

(56) References Cited

U.S. PATENT DOCUMENTS

| | | | |
|---|---|---|---|
| 2002/0191785 A1 | 12/2002 | McBrearty et al. | |
| 2006/0109792 A1 | 5/2006 | Broadbent et al. | |
| 2009/0013408 A1* | 1/2009 | Schipka | H04L 63/145 726/24 |
| 2009/0183056 A1* | 7/2009 | Aston | G06F 11/1004 714/799 |
| 2010/0036861 A1 | 2/2010 | Srihari et al. | |
| 2010/0290468 A1* | 11/2010 | Lynam | H04L 45/742 370/392 |
| 2012/0060165 A1* | 3/2012 | Clarke | G06F 9/5038 718/104 |
| 2013/0179760 A1* | 7/2013 | Lee | H03M 13/091 714/807 |

* cited by examiner

DATA PROCESSING VALIDATION

BACKGROUND

In a data processing system it is typically necessary to validate the output in order that errors are detected and removed. The validated output is then usable by downstream systems to achieve improved accuracy and quality of performance.

Errors can occur for a variety of reasons, such as where data becomes corrupted, data is lost due to equipment malfunction, or where data is erroneous because of errors in operation of data processing stages. In data processing systems where several dependent stages are deployed, errors quickly become compounded or exacerbated as erroneous data propagates through the data processing pipeline. Intermediate validation may occur between the different processing stages in order to try to prevent errors from propagating.

Validation itself can be a lengthy and complex process which can introduce significant latency to an overall data processing system. Where large amounts of data are to be processed existing validation processes are often unable to scale up appropriately. This is a particular problem for web-based services and/or in situations where data is to be processed in real time, for example, to control a downstream system such as a wearable computer, a robotic system or other.

The embodiments described below are not limited to implementations which solve any or all of the disadvantages of known data processing validation systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data processing stage is described which has a communications interface arranged to receive a plurality of input data chunks. Each input data chunk has a pointer to a validation record, where the validation records are stored at a memory accessible to the data processing stage. A processor of the data processing stage is configured to create an initially empty output validation record at the memory, and to link the output validation record to the validation records of the input chunks. The processor is configured to compute an output chunk from the input chunks and to either drop the output chunk or emit the output chunk dependent on inspection of the output validation record and validation records linked to the output validation record.

A computer-implemented data processing method may be executed at a data processing stage. For example, it comprises receiving a plurality of input data chunks, each having a pointer to a validation record, the validation records stored at a memory; and creating an initially empty output validation record at the memory. The method may involve linking the output validation record to validation records of the input chunks; computing an output chunk from the input chunks and either dropping the output chunk or emitting the output chunk dependent on inspection of the output validation record and validation records linked to the output validation record. In some examples the method involves sending a message to a validation process comprising a pointer to the output validation record.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
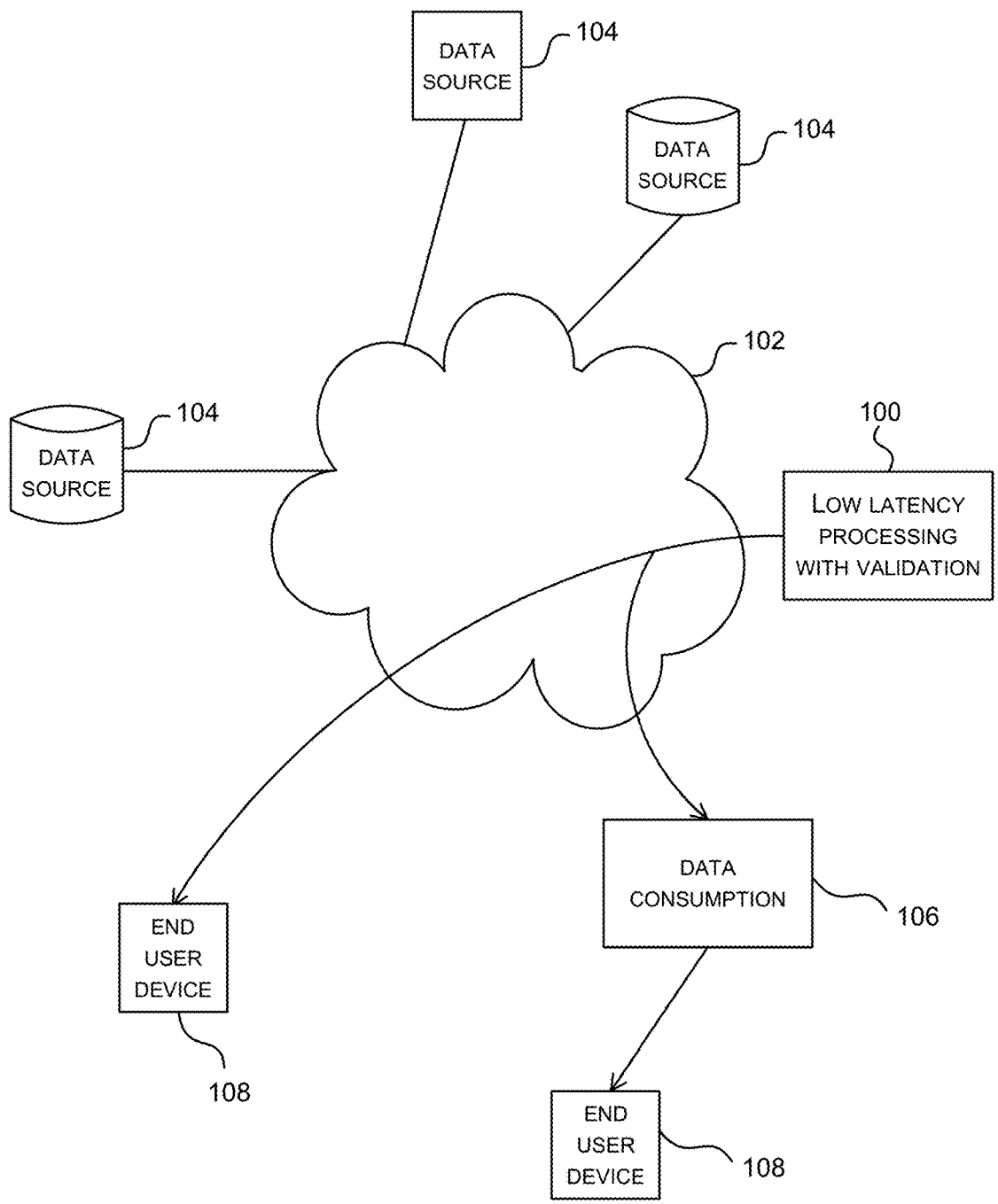
FIG. 1 is a schematic diagram of a low latency data processing system with validation.

FIG. 1 is a schematic diagram of a low latency data processing system 100 with validation. In this example, the data processing system is part of a cloud service and accesses data from a plurality of different data sources 104 over a communications network 102. The data processing system 100 processes the data it accesses to produce output data that is consumed by data consumption nodes 106 and/or end user devices 108. For example, a data source may generate a stream of data in particular format whilst another data source may generate related data in another format. The data processing system may aggregate or join chunks of data from the sources by finding chunks of data from the same or different data sources which are related, for example because they are about common material, and combining those data chunks to form a single aggregate data chunk. The process of finding data chunks from the same or different data sources which are about common material may be complex and may comprise many separate steps. A data chunk is one or more items of data and in some examples comprises several million items. As the size of the data chunks increases so does the time taken at the individual validation stages.

In some examples, the data processing system is configured to operate in real-time, processing live streams of data from the data sources 104. For example, to identify and aggregate related data items from different data sources to produce output that is more immediately useful to data consumption nodes 106 and/or end user devices 108 than raw data from the data sources 104. The burden of finding data to be combined and making the combination/aggregation is placed on the cloud service rather than at the end user device 108 or data consumption node 106.

In many examples, web-scale amounts of data are processed by the data processing system 100 which may comprise a data center, a cluster of compute servers, or other server side or cloud side computing equipment. In order to achieve a practical, working solution which is robust, data output by the data processing system 100 is validated. Data which is found to be invalid is not output by the data processing system.

The data processing system 100 comprises a plurality of data processing stages (which are dependent on one another) and a plurality of validation stages. The validation stages act together to ensure that data output by the data processing system 100 is validated. That is, data which is found to be invalid by the validation stages is not output by the data processing system. The validation stages are intermediate validation stages as opposed to validation occurring at the final output of a data processing system. Where validation is carried out on final output, it is difficult to find the root cause, that is, the first data processing stage which introduced corrupted data which then propagated through the data processing system. By using intermediate validation stages, the process of identifying the root cause is facilitated.

Validated data is data that has been assessed as likely, with a relatively high confidence, to be correct. Unvalidated data is data that has not been assessed as being correct or incorrect. Invalid data is data that has been assessed as likely, with a relatively high confidence, to be incorrect. Invalid data may occur for various different reasons, including but not limited to data becoming corrupted because of equipment malfunction, errors in encryption or decryption processes, errors in formatting or parsing processes, errors in memory reading/writing, errors in data compression and/or decompression, data being lost in whole or in part due to communications errors or for other reasons.

Embodiments described below achieve low latency in data processing, despite ensuring that data output by the data processing system 100 is validated. This is a significant achievement since previous approaches have introduced high latency by waiting for validation to complete after each data processing stage of a series of dependent data processing stages forming a processing pipeline.

Figure 2:
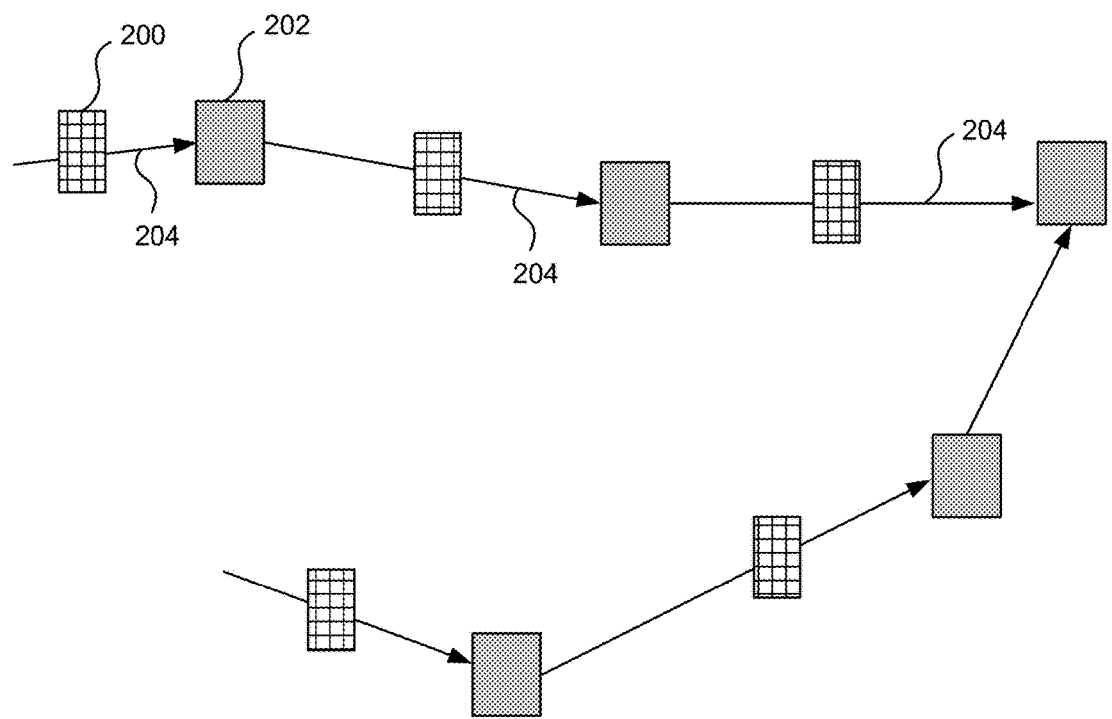
FIG. 2 is a schematic diagram of a low latency data processing system with validation in more detail.

For example, as illustrated in FIG. 2 the data processing system 100 comprises a plurality of data processing stages 202 which are sequential so that the output of one stage forms input for another stage and so on. When represented as a graph where each data processing stage is represented as a node and edges connect nodes, the graph is a directed acyclic graph. This is a graph with no loops and with a direction of data flow that is specified. Each data processing stage takes as input one or more data chunks and outputs a single chunk; it does this repeatedly as new input data chunks arrive. Each data processing stage is implemented using software and/or hardware. The particular algorithm that any given data processing stage implements is dependent on the application domain.

As shown in FIG. 2 the data processing system 100 also comprises a plurality of validation stages 200. Each validation stage is implemented using software and/or hardware. In the example of FIG. 2 there is one validation stage 200 for each data processing stage. However, this is not essential. Some of the validation stages may be omitted. The validation stages may be located at the same equipment as the data processing stages or at other locations. A validation stage operates to assess data in a specified data chunk and determine if the data is valid, invalid or unassessed. Any suitable assessment algorithm may be used depending on the application domain.

Figure 3:
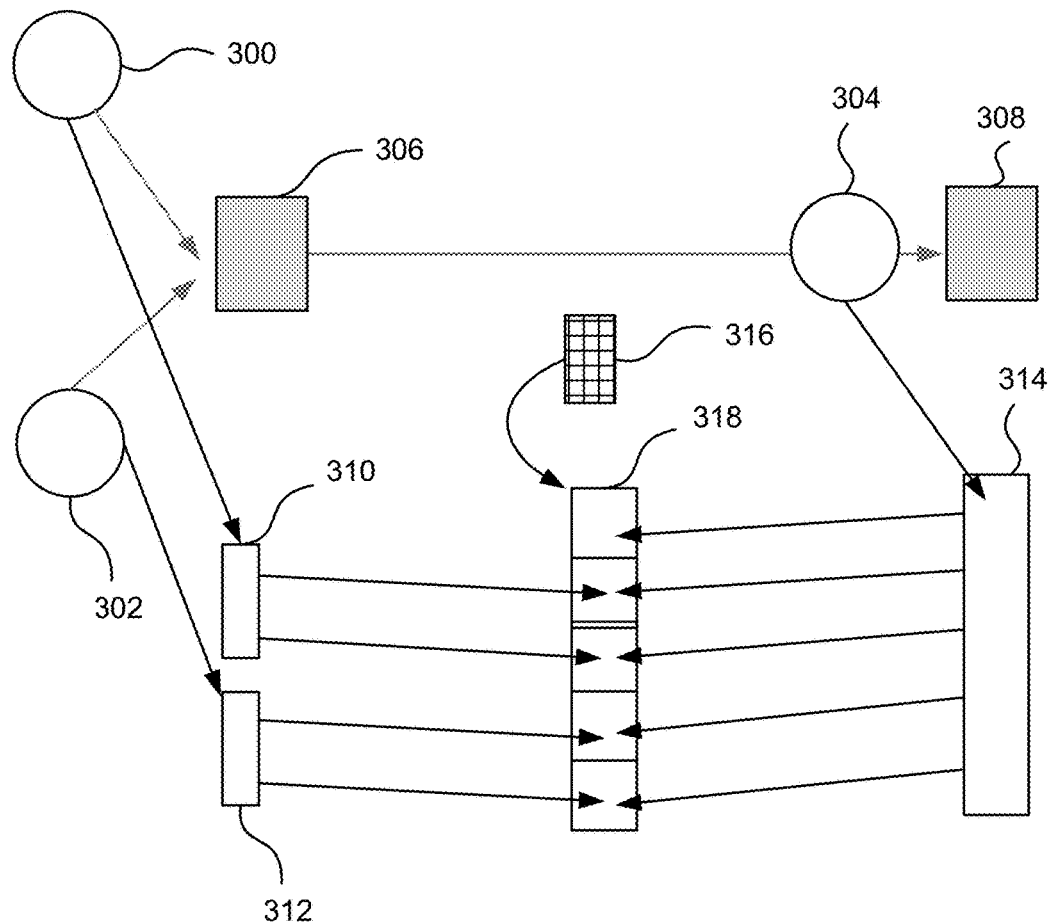
FIG. 3 is a schematic diagram of part of the system of FIG. 2 in more detail.

FIG. 3 is a schematic diagram of part of the system of FIG. 2 in more detail. Two data processing stages 306, 308 are shown. A first data processing stage 306 receives as input two input data chunks 300, 302 and produces as output a single output data chunk 304. The output data chunk is sent to a second data processing stage 308.

A validation stage 316 may subscribe to data chunks 304 output by the first data processing stage 306. As a result of this subscription, data chunks 304 output by the first data processing stage are available to validation stage 316.

Each of the input data chunks 300, 302 has its own validation record referred to here as an input validation record. For example, data chunk 300 has an input validation record 310 and data chunk 302 has an input validation record 312. The input validation records comprise references to validation records of data chunks used by any previous data processing stages to produce the input data chunk. In some examples a list structure is used to store the references so that each input data chunk simply has a pointer to a list of validation records of its ancestor data chunks. The pointers are addresses or references to memory locations at which validation results are stored. The input validation records may be unvalidated, or valid or invalid. Where a validation stage of an ancestor data chunk (not shown in FIG. 3) is still operating the validation record of the child data chunk will be unvalidated. Unvalidated validation records eventually become valid or invalid validation records as the validation stages operate.

As mentioned above, the validation stage 316 subscribes to the first data processing stage and receives data chunks 304 output by the first data processing stage 306. The validation stage 316 has access to the validation record of the data chunks 304 output by the first data processing stage and can tell from the validation record of a data chunk whether a validation has already been executed for that data chunk. If the validation record is "unvalidated" then the validation stage proceeds with validation of the associated data chunk. It carries out a validation algorithm of any suitable type to assess the validity of the output data chunk 304 and to update the validation record according to whether the output data chunk is found valid, or is found invalid.

When the data processing stage 306 forms the output validation record it links the input validation records to the output validation record. For example, a pointer to a list 314 is formed comprising a pointer to the output validation record and pointers to the input ancestor validation records. In this way a pointer list enables a validation stage, or a data processing stage, to find memory locations at which validation results are stored for a particular data chunk. The input validation records may themselves be represented by pointer lists referencing memory locations where validation results are stored for the input data chunks, any parents of those input data chunks and so on.

A data processing stage may be arranged to repeatedly check the validation record 318. If the validation record indicates that a data chunk is invalid then the data chunk is dropped or discarded and the data processing step proceeds with its data processing, for example, using a previous version of the data chunk which has been successfully validated and/or by triggering an alert to an operator. In some examples, the data processing step proceeds without that data chunk. For example, by moving on to the next input data chunks which are received. Otherwise the data processing stage may continue with its data processing. For example, where the validation record 318 indicates that the output data chunk is unassessed, or that the input data chunks are still unassessed or only partially assessed, the data processing stage is able to continue with its data processing.

In this way, data processing is able to proceed without waiting for validation of the input chunks to complete. This enables data processing to be low latency. Even though data processing is low latency, it is ensured that only validated data is output by the data processing system as described in more detail below.

Functionality of a data processing stage or of a validation stage described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4:
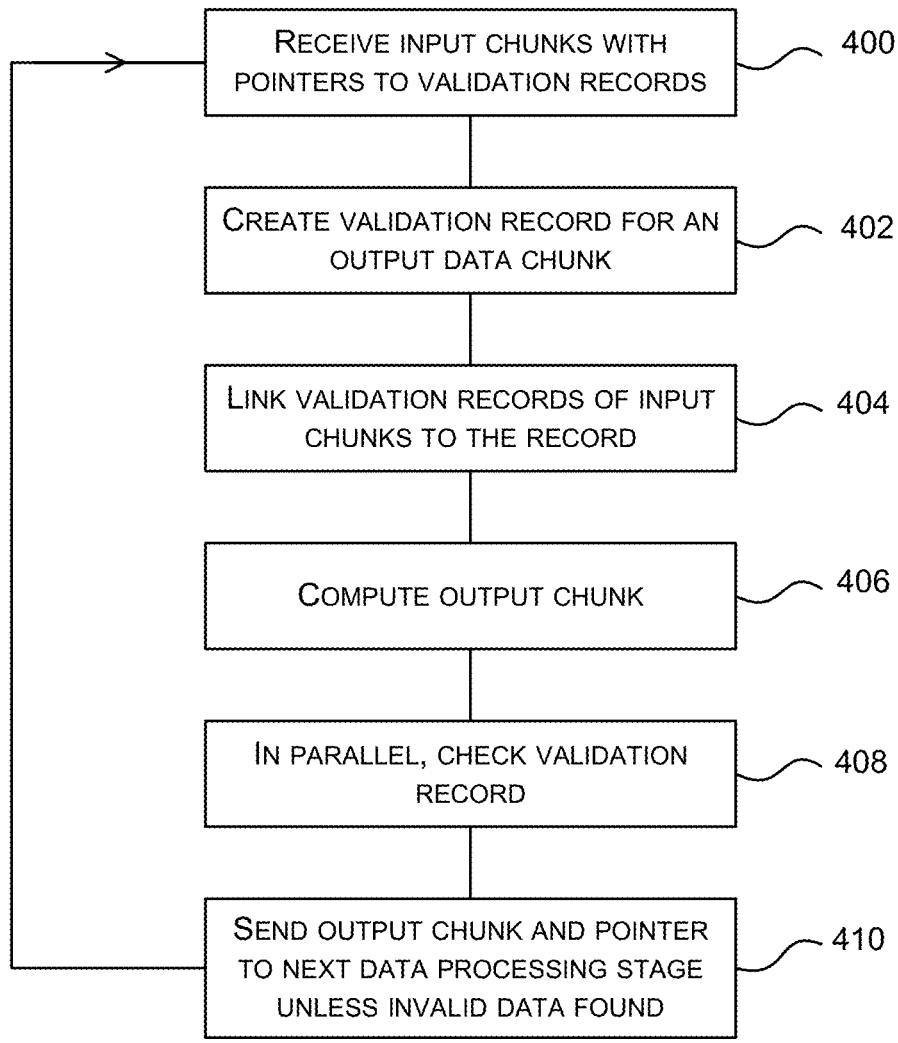
FIG. 4 is a flow diagram of a method at a data processing stage.

FIG. 4 is a flow diagram of a method at a data processing stage. Input data chunks are received 400 each having pointers (such as a pointer list described above with reference to FIG. 3) to input validation records. The data processing stage creates 402 an output validation record for an output data chunk. It links 404 the output validation record to the input validation records. For example, by creating a pointer list.

The data processing stage computes 406 an output chunk from the input data chunks.

In parallel with the process of computing the output chunk the data processing stage repeatedly checks 408 the output validation record. The output validation record may be being filled by a validation stage and/or the input validation records may be being filled by a validation stage. If any invalid data is found the output chunk is dropped, or replaced by an older version of the chunk which is known to be valid. For example, if the validation record (which includes the validation records of ancestor chunks) is found to contain any invalid data, the output chunk is dropped (that is, not sent to the next data processing stage), or an alert is triggered, or an older version of the chunk which is known to be valid is used. If no invalid data is found (that is, the validation record indicates only valid or unassessed data) then the output chunk is sent 410 to the next processing stage together with the pointer list referencing the validation record.

If any invalid data is found, an alert may be triggered. In some examples a message is generated comprising the invalid data and sent to specified addresses such as a management node, data log or other location. As more input chunks are received the process repeats from step 400.

Figure 5:
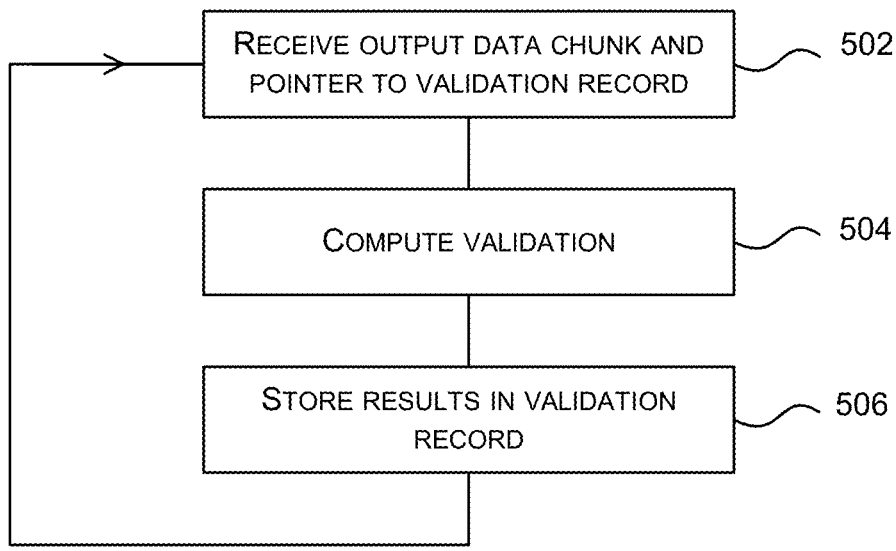
FIG. 5 is a flow diagram of a method at a validation stage.

FIG. 5 is a flow diagram of process at a validation stage. The validation stage subscribes to a data processing stage and as a result receives 502 an output chunk or a reference or pointer to the output chunk. The validation stage also receives a pointer to the validation record of the output chunk. The output chunk and the pointer to the validation record may be received at different times.

Figure 7:
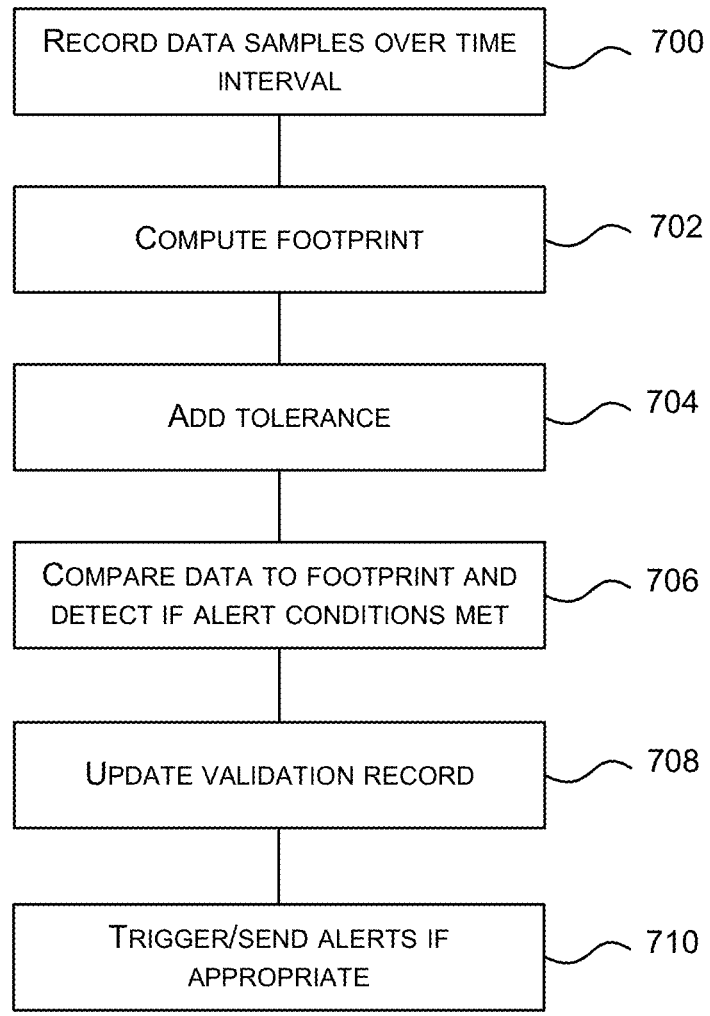
FIG. 7 is a flow diagram of part of a method at a validation stage.

The validation stage proceeds to compute 504 a validation of the output chunk using any suitable validation algorithm. For example, a checksum, a comparison of the data chunk with a statistical footprint of previously observed data chunks from the stream, or other error checking process. The results of the validation algorithm are stored 506 in the validation record and the process repeats for the next output chunk. An example of a validation process which uses a statistical footprint is described later with reference to FIG. 7.

Figure 6:
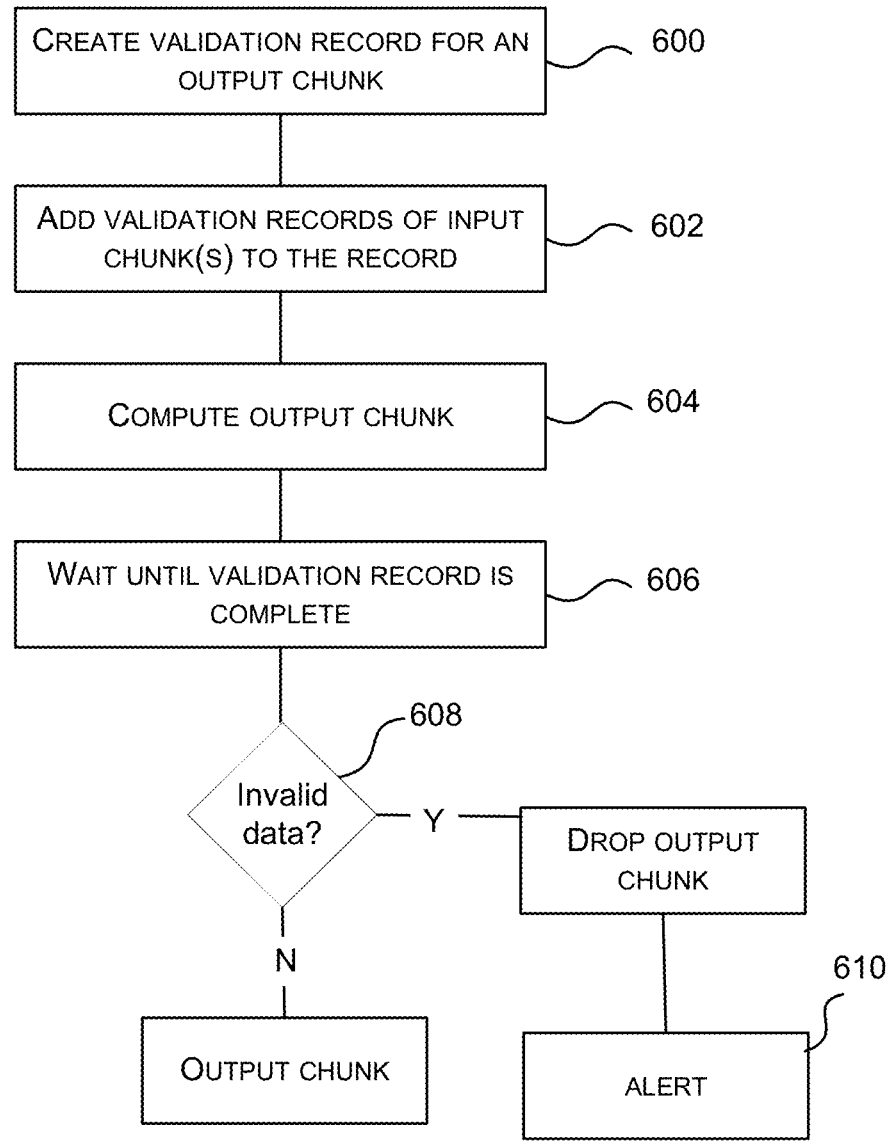
FIG. 6 is a flow diagram of a method at an endpoint data processing stage.

With reference to FIG. 6 an example of a process at an endpoint of a data processing pipeline is described. An endpoint of a data processing pipeline is a data processing stage which is a terminal node of a directed acyclic graph representing the data processing pipeline as described earlier. The endpoint is configured to only output data chunks which are valid (as assessed by the validation stage of the endpoint).

The endpoint data processing stage creates 600 a validation record for an output chunk. It adds 602 validation records of input chunks it receives to the record as described above. It computes 604 an output chunk from the input chunks. The endpoint data processing stage waits 608 until the validation record for the output chunk is complete, that is, has only indications that the data is either valid or invalid, but no indications that the data is unassessed. For example, the endpoint data processing stage repeatedly checks the validation record to see if it is filled with assessment results.

The endpoint data processing system checks to see if invalid data is indicated in the validation record. If so, the endpoint data processing system may use an earlier version of the data chunk which is known to be valid. In some examples, the data processing system drops the output chunk. In some examples the data processing system triggers an alert 610 and/or sends a message with the invalid output chunk to a maintenance node or an operator. If there is only valid data indicated in the validation record (including the validation records of ancestor chunks referenced in the validation record) then the endpoint data processing system outputs the data chunk.

In an example the validation stage records 700 data samples over a time interval. For example, the streams of input chunks and the output chunks are recorded for individual ones of the data processing stages. Using this recorded data, a footprint is computed 702 for a data processing stage. The footprint is a statistical footprint comprising values such as the maximum and minimum values of particular parameters, the average, median or mode of particular parameters, the variance of particular parameters and other statistics. Tolerance margins may be added 704 to the values of the footprint.

Once the footprint has been computed for a particular data processing stage, live data from the data processing stage may be compared 706 with the footprint in order to detect if alert conditions are met. Alert conditions may be thresholds, percentage differences, or other criteria or rules.

The validation record is updated 708 using the results of the validation process and, if appropriate, alerts are triggered or messages sent 710 comprising data found to be invalid.

The examples described herein may also be implemented where the data processing pipeline is implemented on a single device rather than as a cloud service. For example, each data processing stage may be an assembler process for assembling computer programs. In some examples each data processing stage is implemented in hardware.

Figure 8:
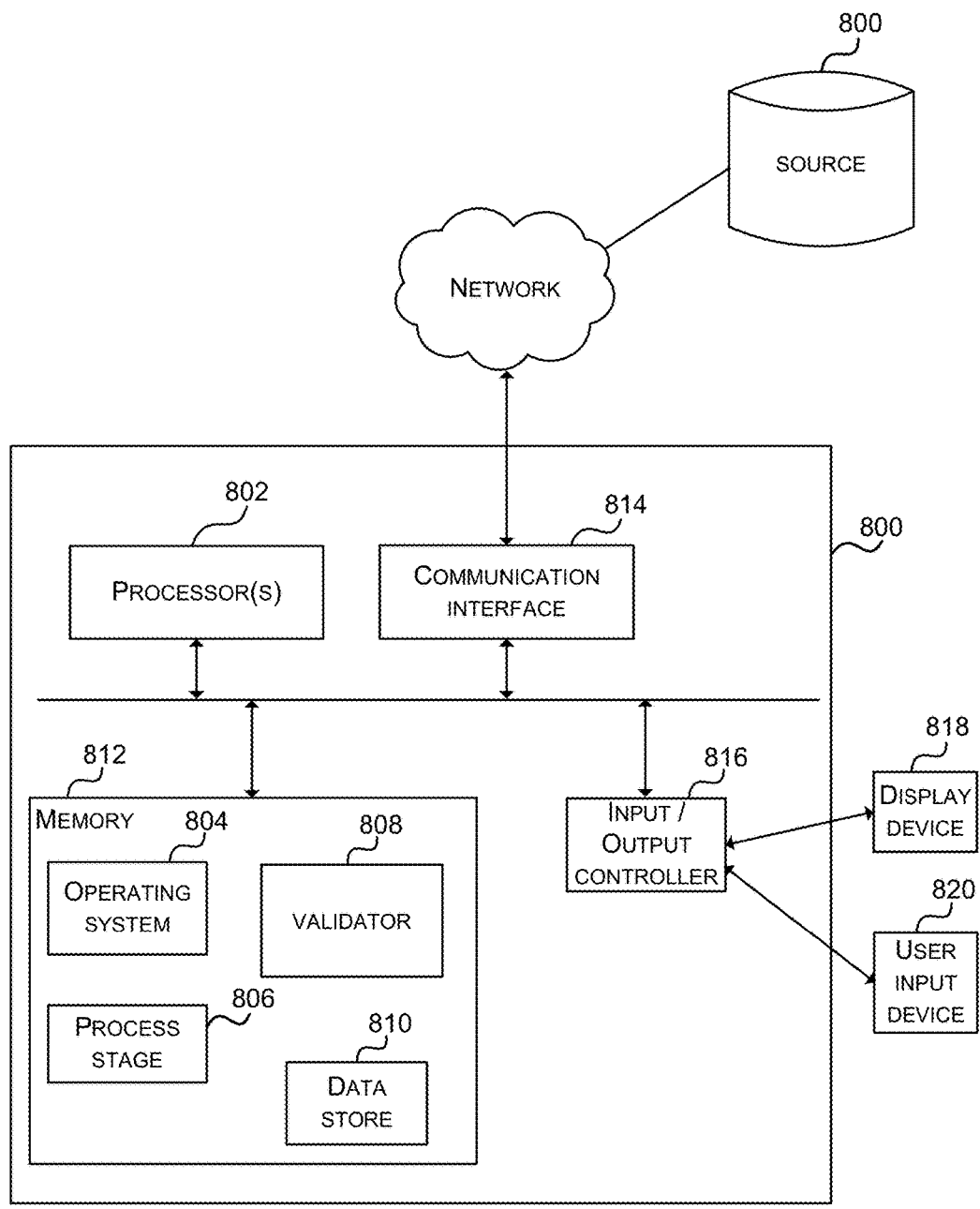
FIG. 8 illustrates an exemplary computing-based device in which embodiments of a data processing stage or a validation stage may be implemented.

FIG. 8 illustrates various components of an exemplary computing-based device 800 which may be implemented as any form of a computing and/or electronic device, and in which embodiments of a data processing stage or a validation stage may be implemented.

Computing-based device 800 comprises one or more processors 802 which may be microprocessors, controllers or any other suitable type of processors for processing computer executable instructions to control the operation of the device in order to process data to produce validated output in a fast, efficient manner. In some examples, for example where a system on a chip architecture is used, the processors 802 may include one or more fixed function blocks (also referred to as accelerators) which implement a part of the method of any of FIGS. 4 to 7 in hardware (rather than software or firmware). Platform software comprising an operating system 804 or any other suitable platform software may be provided at the computing-based device to enable application software to be executed on the device. One or more process stages 806 are implemented at the computing-based device as well as one or more validators 808. A process stage implements a method such as that of FIG. 4 and a validation stage implements a method such as that of FIG. 5. A data store 810 holds validation records, pointers, addresses of data sources 800, and other data.

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 800 it will be appreciated that the storage may be distributed or located remotely and accessed via a network or other communication link (e.g. using communication interface 814).

The computing-based device 800 also comprises an input/output controller 816 arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse, keyboard, camera, microphone or other sensor). In some examples the user input device 820 may detect voice input, user gestures or other user actions and may provide a natural user interface (NUI). This user input may be used to specify statistical footprints, specify data sources, configure data processing pipelines, view validation records, view alerts, view invalid data, or other purposes. In an embodiment the display device 818 may also act as the user input device 820 if it is a touch sensitive display device. The input/output controller 816 may also output data to devices other than the display device, e.g. a locally connected printing device (not shown in FIG. 8).

Any of the input/output controller 816, display device 818 and the user input device 820 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

An example provides a data processing stage comprising:

a communications interface arranged to receive a plurality of input data chunks, each having a pointer to a validation record, the validation records stored at a memory accessible to the data processing stage; and a processor configured to create an initially empty output validation record at the memory, and to link the output validation record to the validation records of the input chunks;

the processor configured to compute an output chunk from the input chunks and to either drop the output chunk or emit the output chunk dependent on inspection of the output validation record and validation records linked to the output validation record.

For example the processor is configured to send a message to a validation process comprising a pointer to the output validation record.

For example the processor is configured to compute the output chunk in parallel with a validation process operating to fill the output validation record and the validation records of the input data chunks.

For example the processor is configured to compute the output chunk without waiting for validation of the input chunks to complete.

For example the processor is configured to link the output validation record to the validation records of the input chunks by adding pointers which reference the input chunk validation records to a pointer list, comprising the pointer to the output validation record.

For example the processor is arranged, in the case the output chunk is emitted, to send the output data chunk and the pointer list to a subsequent data processing stage.

For example the communications interface is arranged to receive one or more streams of the input data chunks and where the processor is configured to repeat the process of creating an output validation record and computing an output chunk.

For example the validation records of the input data chunks have been formed by an immediately preceding data processing stage.

For example the validation records of the input data chunks are themselves linked to validation records of another data processing stage upon which the data processing stage is dependent.

For example the processor is configured to send or trigger an alert in the case that the output chunk is dropped.

For example the processor is configured, in the case that the output chunk is dropped, to generate a message comprising the output chunk and to send the message to one or more specified addresses.

For example wherein the processor is arranged to repeatedly check the output validation record to identify whether the validation record: contains at least one invalid entry; or contains only incomplete or valid entries.

In an example there is provided a computer-implemented data processing method comprising:

receiving a plurality of input data chunks, each having a pointer to a validation record, the validation records stored at a memory; and creating an initially empty output validation record at the memory;

linking the output validation record to the validation records of the input chunks;

computing an output chunk from the input chunks and either dropping the output chunk or emitting the output chunk dependent on inspection of the output validation record and validation records linked to the output validation record; and sending a message to a validation process comprising a pointer to the output validation record.

The method described in the paragraph above may comprise linking the output validation record to the validation records of the input chunks by adding pointers which reference the input chunk validation records to a pointer list, comprising the pointer to the output validation record.

The method can comprise repeatedly checking the output validation record to identify whether the validation record: contains at least one invalid entry; or contains only incomplete or valid entries.

In an example, there are one or more tangible device-readable media with device-executable instructions that, when executed by a computing system, direct the computing system to perform for performing steps comprising:

receiving a plurality of input data chunks, each having a pointer to a validation record, the validation records stored at a memory; and creating an initially empty output validation record at the memory;

linking the output validation record to the validation records of the input chunks;

computing, in parallel with a validation process operating to fill the output validation record, an output chunk from the input chunks and either dropping the output chunk or emitting the output chunk dependent on inspection of the output validation record and validation records linked to the output validation record.

For example, the steps comprise linking the output validation record to validation records of the input chunks by adding pointers which reference the input chunk validation records to a pointer list, comprising the pointer to the output validation record.

For example the steps comprise sending the output data chunk and the pointer list to a subsequent data processing stage.

For example the steps comprise repeatedly checking the output validation record to identify whether the validation record: contains at least one invalid entry; or contains only incomplete or valid entries.

For example the steps comprise, in the case the output data chunk is dropped, generating a message comprising the dropped data chunk and sending the message to one or more specified addresses.

In an example there is a validation stage for use with a data processing stage of a data processing pipeline, the validation stage comprising:

a communications interface configured to receive an output data chunk from the data processing stage and a pointer to a validation record of the output data chunk;

a processor arranged to execute a validation algorithm in order to validate the output data chunk and to store the results of the validation algorithm in the validation record.

A validation process for use with a data processing stage of a data processing pipeline, the validation process comprising:

receiving an output data chunk from the data processing stage and a pointer to a validation record of the output data chunk;

executing a validation algorithm in order to validate the output data chunk; and storing the results of the validation algorithm in the validation record.

In examples there is a computer program, stored on a computer readable medium, where the computer program comprises instructions which when executed on a computer implement the method described immediately above.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A data processing stage comprising:
   a communications interface arranged to receive a plurality of input data chunks, each having a pointer to a validation record, the validation records stored at a memory accessible to the data processing stage; and
   a processor configured to create an initially empty output validation record at the memory, and to link the output validation record to the validation records of the input chunks;
   the processor configured to compute an output chunk from the input chunks and to either drop the output chunk or emit the output chunk dependent on inspection of the output validation record and validation records linked to the output validation record.

2. The data processing stage of claim 1 wherein the processor is configured to send a message to a validation process comprising a pointer to the output validation record.

3. The data processing stage of claim 1 wherein the processor is configured to compute the output chunk in parallel with a validation process operating to fill the output validation record and the validation records of the input data chunks.

4. The data processing stage of claim 1 wherein the processor is configured to compute the output chunk without waiting for validation of the input chunks to complete.

5. The data processing stage of claim 1 wherein the processor is configured to link the output validation record to the validation records of the input chunks by adding pointers which reference the input chunk validation records to a pointer list, comprising the pointer to the output validation record.

6. The data processing stage of claim 5 wherein the processor is arranged, in the case the output chunk is emitted, to send the output data chunk and the pointer list to a subsequent data processing stage.

7. The data processing stage of claim 1 where the communications interface is arranged to receive one or more streams of the input data chunks and where the processor is configured to repeat the process of creating an output validation record and computing an output chunk.

8. The data processing stage of claim 1 where the validation records of the input data chunks have been formed by an immediately preceding data processing stage.

9. The data processing stage of claim 1 where the validation records of the input data chunks are themselves linked to validation records of another data processing stage upon which the data processing stage is dependent.

10. The data processing stage of claim 1 wherein the processor is configured to send or trigger an alert in the case that the output chunk is dropped.

11. The data processing stage of claim 1 wherein the processor is configured, in the case that the output chunk is dropped, to generate a message comprising the output chunk and to send the message to one or more specified addresses.

12. The data processing stage of claim 1 wherein the processor is arranged to repeatedly check the output validation record to identify whether the validation record: contains at least one invalid entry; or contains only incomplete or valid entries.

13. A computer-implemented data processing method comprising:
   receiving a plurality of input data chunks, each having a pointer to a validation record, the validation records stored at a memory;
   creating an initially empty output validation record at the memory;
   linking the output validation record to the validation records of the input chunks;
   computing an output chunk from the input chunks and either dropping the output chunk or emitting the output chunk dependent on inspection of the output validation record and validation records linked to the output validation record; and
   sending a message to a validation process comprising a pointer to the output validation record.

14. The method of claim 13 comprising linking the output validation record to the validation records of the input chunks by adding pointers which reference the input chunk validation records to a pointer list, comprising the pointer to the output validation record.

15. The method of claim 13 comprising repeatedly checking the output validation record to identify whether the validation record: contains at least one invalid entry; or contains only incomplete or valid entries.

16. One or more tangible device-readable media with device-executable instructions that, when executed by a computing system, direct the computing system to perform for performing steps comprising:
receiving a plurality of input data chunks, each having a pointer to a validation record, the validation records stored at a memory;
creating an initially empty output validation record at the memory;
linking the output validation record to the validation records of the input chunks; and
computing, in parallel with a validation process operating to fill the output validation record, an output chunk from the input chunks and either dropping the output chunk or emitting the output chunk dependent on inspection of the output validation record and validation records linked to the output validation record.

17. The device-readable media of claim 16 the steps comprising linking the output validation record to the validation records of the input chunks by adding pointers which reference the input chunk validation records to a pointer list, comprising the pointer to the output validation record.

18. The device-readable media of claim 17 the steps comprising sending the output data chunk and the pointer list to a subsequent data processing stage.

19. The device-readable media of claim 16 the steps comprising repeatedly checking the output validation record to identify whether the validation record: contains at least one invalid entry; or contains only incomplete or valid entries.

20. The device-readable media of claim 16 the steps comprising, in the case the output data chunk is dropped, generating a message comprising the dropped data chunk and sending the message to one or more specified addresses.

* * * * *